Nov. 6, 1956        A. E. MARTOIS        2,769,235

PORTABLE PIPE CUTTING MACHINE

Filed March 14, 1955        2 Sheets-Sheet 1

INVENTOR
ARTHUR E. MARTOIS,
BY
ATTORNEY.

Nov. 6, 1956 A. E. MARTOIS 2,769,235
PORTABLE PIPE CUTTING MACHINE
Filed March 14, 1955 2 Sheets-Sheet 2
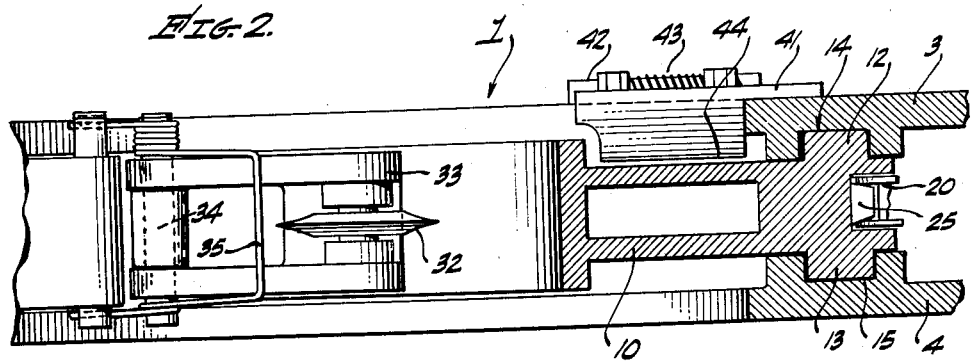
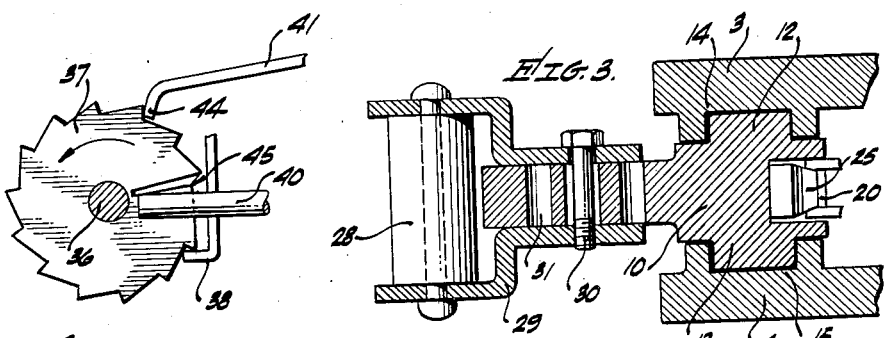
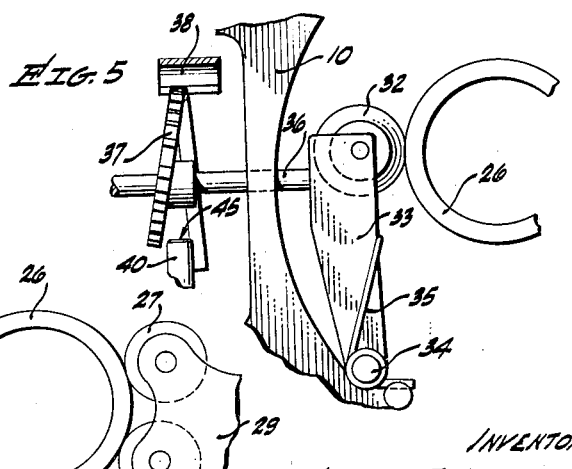
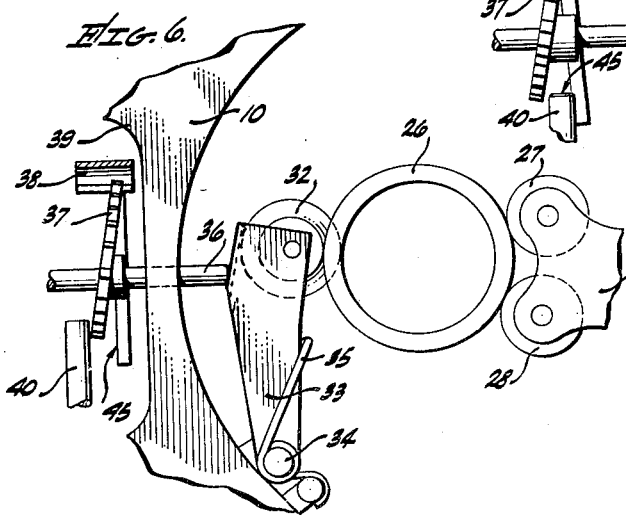
INVENTOR.
ARTHUR E. MARTOIS,
ATTORNEY.

United States Patent Office 2,769,235
Patented Nov. 6, 1956

2,769,235

PORTABLE PIPE CUTTING MACHINE

Arthur E. Martois, Los Angeles, Calif.

Application March 14, 1955, Serial No. 494,201

2 Claims. (Cl. 30—97)

This invention relates to a portable pipe cutting machine whereby pipe may be readily cut in the field or at the place of installation.

An object of my invention is to provide a novel portable pipe cutting machine which can be readily moved from place to place, and which can be operated by a single workman to effectively and quickly sever commercial pipe, such as is used in plumbing and similar installations.

Another object of my invention is to provide a novel portable pipe cutting machine in which the cutting member is automatically advanced into the pipe as the chuck is rotated.

Another object of my invention is to provide a novel portable pipe cutting machine in which the cutter is automatically retracted after the pipe has been severed.

Another object of my invention is to provide a novel portable pipe cutting machine in which both the body of the machine and the chuck mounted therein are provided with alignable openings, so that the pipe can be readily inserted into the chuck portion of the machine.

Other objects, advantages and features of invention may appear from the accompanying drawings, the subjoined detailed description and the appended claims.

In the drawings:

Figure 2 is a fragmentary transverse sectional view taken on line 2—2 of Figure 1.

Figure 3 is a fragmentary sectional view taken on line 3—3 of Figure 1.

Figure 4 is a side elevation of the cutter advancing spiral.

Figure 5 is a fragmentary top plan view of the cutter and the advancing spiral therefor, shown in one position of the parts.

Figure 6 is a view similar to Figure 5 but showing the pipe cutter in the final cutting position.

Figure 1:
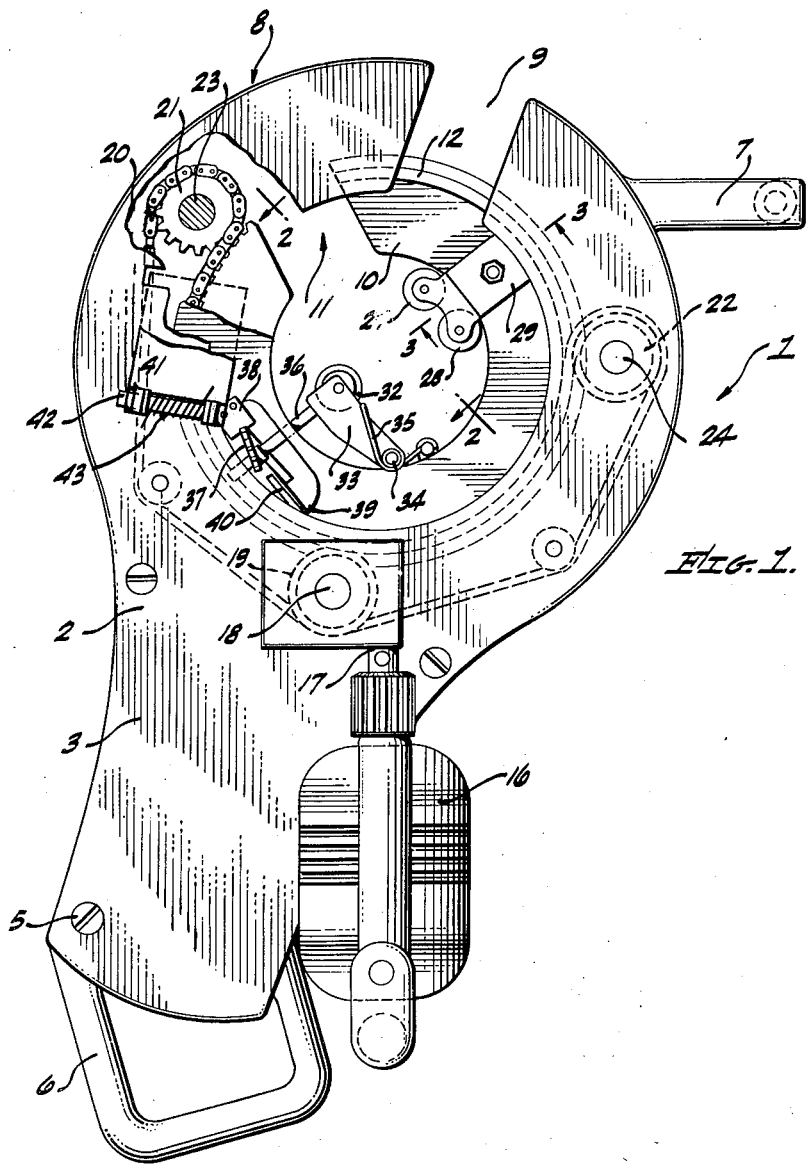
Figure 1 is a top plan view of my invention with parts broken away to show interior construction.

Referring more particularly to the drawing, my pipe cutting machine 1 consists of an elongated frame member 2 including upper and lower spaced plates 3 and 4. These plates are suitably bolted together by appropriate bolts, cap screws, studs, or the like 5. Handles 6 and 7 are attached to or form a part of the frame 2 and are used to move the machine, as may be necessary. The forward portion 8 of the machine is substantially circular and may be formed with a radial opening 9 through which the pipe can be inserted. The opening 9 is not essential, however, since the pipe may be inserted endwise into the chuck, which will be subsequently described, if it is found desirable. However, for ease and rapidity of operation I prefer that the opening 9 be provided. A circular chuck 10 is mounted in the frame 2 and is rotated in this frame in a manner to be subsequently described. The chuck 10 may also be provided with an opening 11 extending radially therethrough, and this opening is aligned with the opening 9 to permit pipe to be moved into the chuck 10. However, the opening 11 may also be eliminated, if desirable, and the chuck 10 may in that instance be a complete circular member. The chuck 10 is formed with upper and lower annular ribs 12 and 13, which fit into circular grooves 14 and 15, respectively, in the frame 2. Thus the chuck 10 is accurately guided in the frame 2 as the chuck is rotated.

Rotation of the chuck 10 is accomplished in the following manner: An electric motor 16 is mounted on the frame 2 and the shaft 17 of this motor drives a shaft 18 through appropriate reduction gears. The shaft 18 has a sprocket 19 secured thereto which acts as a driving sprocket for the chain 20 which encircles the same. The chain 20 also encircles idler sprockets 21 and 22 which are mounted on shafts 23 and 24, respectively, in the frame 2. The chain 20 engages the teeth 25 on the chuck 10 for the purpose of rotating this chuck in the frame 2. The chain 20 encircles the chuck 10 for a distance greater than 180° and, consequently, the chuck will be adequately and effectively driven by the chain 20 and, furthermore, the chain will not slip even though the space 11 must be spanned by the chain.

The pipe 26, which is to be severed, is either inserted endwise into the central opening of the chuck 10, or is inserted through the aligned openings 9 and 11. Idler rollers 27 and 28 are adjustably mounted on the chuck 10 in the following manner: The rollers 27—28 are journaled in a bracket 29 which is bolted to the chuck 10 by the bolt 30. The chuck 10 is formed with holes 31 through which the bolt 30 extends and thus the frame 29 can be moved radially so that the rollers 27—28 will engage and fit against various sized pipe.

The cutter wheel 32 is mounted in a holder 33 which is pivotally mounted on the chuck 10, as shown at 34. The cutter wheel 32 is constantly pressed to a retracted position, that is, away from the pipe 26, by means of the spring 35 which engages the holder 33.

The means to advance the cutter wheel 32 into the pipe 26 for the purpose of severing this pipe is as follows: A shaft 36 is journaled and slidably mounted in the chuck 10 and the inner end of this shaft bears against the holder 33 for the purpose of swinging this holder inwardly in a step by step manner, as will be subsequently described. A ratchet 37 in the form of a spiral of approximately one complete turn is fastened to the outer end of the shaft 36. The ratchet wheel 37 is held against retractive movement by the pawl 38. The ratchet 37 is mounted in a cutout 39 in the chuck 10 so that it may be free to rotate. The wheel 37 is preferably a spiral or a cam, the spiral being approximately one complete turn. A fixed pin 40 is fixed to the chuck 10 and projects over the edge of the ratchet 37 and bears against the outer face of this ratchet, substantially as shown in Figures 4, 5 and 6. As the ratchet 37 is rotated step by step, the spiral face thereof bearing against the stationary pin 40 will cause the shaft 36 to move inwardly, thus gradually pressing the holder 33 inwardly and causing the cutter disc 32 to cut through the pipe 26. A trip plate 41 is hingedly mounted on the pin 42 attached to the frame 2 of the machine. The plate 41 is held downwardly against the surface of the frame 2 by means of the spring 43.

The plate 41 is formed with a downwardly projecting lip 44 which engages the teeth of the ratchet 37, thus causing the ratchet to be rotated the distance of one tooth each time that the chuck 10 makes one complete revolution. As the ratchet 37 is thus rotated it will move against the stationary pin 40 and the side cam surface of the ratchet will press the shaft 36 inwardly in a manner previously described. When the ratchet 37 has made one complete rotation, the spiral end 45 moves off the pin 40, thus permitting the ratchet 37 and the shaft 36 to be again pressed outwardly under pressure of the spring 35, until the pin 40 again bears against the inner face of the spirally formed ratchet 37, thus permitting the cutter disc 32 to be retracted from the pipe 26 so that the pipe can be removed, since it has been severed.

In operation the machine is carried to the place where the pipe is to be cut and may be rested on a bench, or the like, if desired. The pipe 26, which is to be cut, is held in a vise in the usual manner and is inserted either through the openings 9—11 so as to be positioned within the chuck 10, or if the chuck 10 is annular in shape the pipe can be inserted endwise into the chuck. The idler rollers 27—28 are adjusted inwardly to bear against the pipe 26 and the cutter disc 32 is also being pressed against the outside of the same pipe. The electric motor 16 is now started and the chain 20 will be rotated thereby. The chuck 10 is continuously rotated in one direction by the chain 20 and on each rotation of the chuck it will carry the ratchet wheel 37 under the plate 41; the lip 44 of which engages the ratchet wheel to rotate that wheel one tooth. The fixed pin 40 bears against the side of the spirally formed ratchet wheel 37, thus causing the ratchet wheel to be pressed inwardly along with the shaft 36 as the ratchet wheel is rotated. This inward movement of the shaft 36 presses the holder 33 inwardly and moves the cutter wheel 32 into the pipe 26 to sever that pipe. When the cut has been completed, that is, on one complete rotation of the ratchet wheel 37, this wheel drops off of the stationary pin 40 and the pin then strikes the adjacent spaced face of the ratchet 37, thereby permitting the shaft 36 to spring outwardly along with the holder 33, thereby retracting the cutter wheel 32 from the severed pipe. This retraction of the cutter wheel 32 is accomplished by the pressure of the spring 35.

Having described my invention, I claim:

1. A portable pipe cutting machine comprising a frame, one part of said frame being substantially circular in form, a ring shaped chuck, means rotatably mounting said chuck in the circular portion of the frame, a motor, drive means extending from said motor to the chuck, idler rollers mounted on the chuck, a cutter wheel, a holder on which the cutter wheel is journaled, means pivotally mounting said holder on the chuck, a ratchet wheel, a shaft projecting from the ratchet wheel, said shaft being journaled in said chuck and engaging said holder, a cam surface on the ratchet wheel, a pin on the chuck engaging said cam surface to advance said ratchet wheel and shaft against said holder, and means on said frame engageable by said ratchet wheel to rotate said ratchet wheel at each rotation of the chuck.

2. A portable pipe cutting machine comprising a frame, one part of said frame being substantially circular in form, a ring shaped chuck, means rotatably mounting said chuck in the circular portion of the frame, a motor, drive means extending from said motor to the chuck, idler rollers mounted on the chuck, a holder, a cutter wheel journaled in the holder, means pivotally mounting said holder on the chuck, a ratchet wheel, a shaft projecting from the ratchet wheel, said shaft being journaled in said chuck and engaging said holder, said ratchet wheel being formed as a spiral, a pin on the chuck engaging the spiral face of the ratchet wheel to advance said ratchet wheel and shaft against said holder, and means on said frame engageable by said ratchet wheel to rotate said ratchet wheel at each rotation of the chuck.

References Cited in the file of this patent

UNITED STATES PATENTS

| | | |
|---|---|---|
| 882,432 | Thomas | Mar. 17, 1908 |
| 1,029,265 | Borden | June 11, 1912 |
| 1,140,208 | Taylor | May 18, 1915 |
| 1,749,861 | Vosper | Mar. 11, 1930 |
| 1,985,541 | Hoefer | Dec. 25, 1934 |
| 2,447,371 | Sipsma et al. | Aug. 17, 1948 |
| 2,672,682 | Studebaker et al. | Mar. 23, 1954 |
| 2,679,686 | Ingwer et al. | June 1, 1954 |
| 2,692,021 | Nygren | Oct. 19, 1954 |
| 2,699,604 | Ingwer et al. | Jan. 18, 1955 |